March 21, 1933. O. ANKLAM
STREET LAMP CABLE SECURING DEVICE
Re. 18,769
Original Filed Feb. 1, 1932
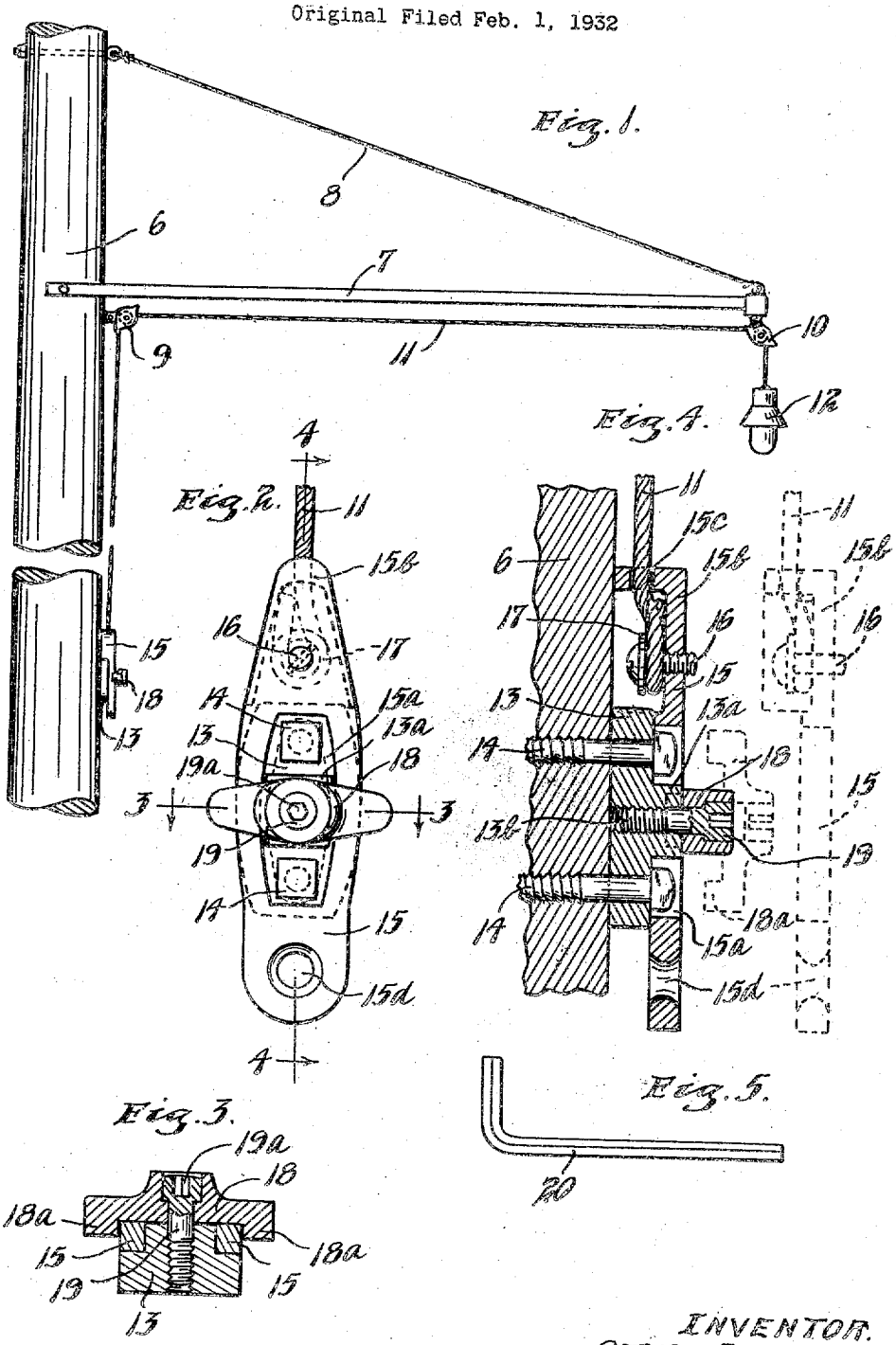
INVENTOR.
OTTO ANKLAM.
BY HIS ATTORNEYS.
Williamson & Williamson Reissued Mar. 21, 1933

Re. 18,769

UNITED STATES PATENT OFFICE

OTTO ANKLAM, OF MINNEAPOLIS, MINNESOTA

STREET LAMP CABLE SECURING DEVICE

Original No. 1,871,023, dated August 9, 1932, Serial No. 590,148, filed February 1, 1932. Application for reissue filed December 17, 1932. Serial No. 647,794.

This invention relates to devices for securing the cables from which street lamps are hung to such supports as posts, to prevent unauthorized persons from meddling with such cables.

It is now the common practice to support street lamps from posts and similar supports by means of cables which run over sheaves carried by the supports. A street lamp is attached to one end of such a cable to be raised or lowered thereby and the other end of the cable is attached to the post or other support. To lower the lamp, it is necessary to release the last mentioned or operating end of the cable from its support. Mischievous boys and other unauthorized persons have caused considerable annoyance and expense to power companies and other owners of such street lamps by releasing the operating ends of such cables from their supports and allowing the lamps to drop to lowered position.

It is the purpose of this invention to provide novel and improved means for attaching the operating end of such a cable as above described to a support, such as a post, to prevent unauthorized persons from releasing the said end of the cable from such a support but permitting authorized persons to, at times, release the said end of the cable from the support.

To this end, generally stated, the invention consists in the novel parts and novel combinations of parts hereinafter defined in the claims and described in the following specification, made in connection with the accompanying drawing, wherein like reference characters refer to the same or similar parts throughout the various views and, in which, Fig. 1 is a view in side elevation illustrating an embodiment of the invention in use for securing the operating end of a street lamp cable to a post;

Fig. 2 is a view in front elevation of the securing device shown in Fig. 1;

Fig. 3 is a horizontal section taken on the line 3—3 of Fig. 2, as indicated by the arrows;

Fig. 4 is a vertical section taken on the line 4—4 of Fig. 2, as indicated by the arrows, and showing the device applied to a post, certain of the parts being shown in one position in full lines and in another position in dotted lines; and Fig. 5 is a view illustratng a key that may be used in connection with the device.

Referring to the drawing, there is illustrated a lamp post 6 having secured adjacent its upper end thereto an outwardly projecting arm 7 supported by a cable 8. A sheave 9 is mounted on post 6 adjacent arm 7, while another sheave 10 is mounted at the outer end of the arm. A cable 11 runs over the two sheaves 9 and 10 and the upper end of this cable is connected to a street lamp 12. The lower end of the cable 11 is adapted to be releasably attached as to the post 6 and by releasing this lower end of the cable from the post, it will be seen that the lamp 12 may be lowered for inspection or repair, whereupon the lamp can be again raised to its operative position.

To releasably secure the lower end of a cable, such as the cable 11, to a support such as the post 6, I provide in accordance with the invention, a block 13 of greater length than width. This block 13 has a rectangular boss 13*a* which projects outwardly beyond the main portion of the outer surface of the block and a tapped opening 13*b* is formed in the block and this tapped opening extends centrally through the boss 13*a*. Block 13 is securely fixed in place on post 6 usually five or six feet from the ground, as by means of spikes 14 which run through upper and lower openings in the block 13, and have heads, the outer surfaces of which are disposed inwardly from the outer surface of boss 13*a*. A plate 15 of a width approximating the greatest width of block 13 and of considerably greater length than the block 13 overlies this block 13 and has an elongated aperture 15*a* therein within which boss 13*a* and the heads of spikes 14 fit. When the plate 15 overlies the block 13, the sides of the boss 13*a* strike the plate to prevent turning movement of the plate relative to the block. Plate 15 has inwardly extending flanges at its sides and upper end above block 13 to form a housing 15*b* having an open inner side. A cable opening 15*c* is cut through the end flange of housing 15*b* to permit insertion of the lower end of cable 11 within the housing. The lower end of the cable 11 is securely anchored within the housing by looping the same about a stud 16 carrying a washer 17 and screw threaded within the housing 15*b*. An opening 15*d* is provided in the lower end of plate 15 to receive a hook (not illustrated). A bar 18 of a length corresponding to the length of the aperture 15*a* and having a central outwardly projecting apertured and recessed boss, bears against the outer surface of the boss 13*a* and normally projects transversely across plate 15. This bar 18 has inturned lugs 18*a* at its two ends between which the plate 15 will be received when the bar is extended transversely of the plate and is disposed flush against the outer surface of the boss 13*a*. A stud 19 projects through the aperture of the bar 18 and is screw threaded within the tapped opening 13*b* of block 13 and this stud has an enlarged cylindrical head which normally fits within the recess of the boss of bar 18. A polygonal-shaped socket 19*a* is provided in the outer surface of the stud 19 to receive one end of a key 20 also of polygonal-shape in cross section.

Under normal circumstances to hold the lower end of the cable 11 securely attached to the post 6 and to prevent detachment of the same from the post by unauthorized persons, the various parts will be positioned as shown in Figs. 1, 2, 3 and in full lines Fig. 4. When the parts are in this position, the post 6 closes the rear side of the housing 15*b* and no access may be had to the lower end of the cable 11. The lugs 18*a* of the bar 18, together with the boss 13*a* prevent removal of the plate 15 from its position overlying the block 13 and also prevent relative rotation between the three parts 13, 15 and 18. As the heads of the spikes 14 are disposed within the aperture 15*a* of the plate 15, access to the spikes for removal of the same cannot be had. As the cylindrical head of the stud 19 fits tightly within the recess of the boss of bar 18, it will be impossible to loosen this stud unless the peculiar shaped key 20 is employed. It is thus practically impossible for unauthorized persons to release the lower end of the cable 11 from the post 6.

When authorized persons desire to lower the lamp 12 for repair, a key such as the key 20, will be first inserted within the socket 19*a* of stud 19 whereupon the stud will be unscrewed for a short distance or until the inner ends of the lugs 18*a* may be swung over the outer face of plate 15. The bar 18 may then be swung through 90° from its position shown in full lines Fig. 4 to its position shown in dotted lines Fig. 4. Plate 15 may then be swung outwardly to the dotted line position shown in Fig. 4 and as this occurs, bar 18 will be carried through the aperture 15*a* of the plate. A hook to which a rope is attached may now be connected with the plate 15 through the hook opening 15*d*, whereupon the lamp 12 may be lowered for adjustment, inspection or repair. It will be seen that the lower end of the cable may be readily reattached in position on the post 6 after the lamp 12 has been again elevated to its original position.

The present device is simple in construction and in operation. It has been successfully demonstrated in actual practice.

It will, of course, be understood that various changes may be made in the form, details, arrangement and proportions of the various parts without departing from the scope of the present invention.

What is claimed is:—

1. A device for securing a cable to a support, comprising a block mounted on said support, said block having a boss formed thereon projecting outwardly from its outer face, a plate overlying said block and having an aperture therein within which said boss is received, a bar bearing against said boss and normally straddling said plate, means at one end of said plate for securing a cable thereto, and a stud having a key opening therein securing said bar to said block.

2. A device for securing a cable of a street lamp to a support, comprising a block attached to the support and having an outwardly projecting boss thereon, a cable anchoring plate fitting over said block and having an aperture therein within which said boss is received, said plate having a housing at one end thereof within which the end of the cable is secured, a bar having inturned lugs at the ends thereof spaced from each other a distance corresponding to the width of said plate, said bar being adapted to be disposed against said boss to project across said member with said lugs one at each side of said member and a stud having a wrench receiving opening at its outer end passing through said bar and screw threaded within the boss of said plate.

3. A device for securing a cable of a street lamp to a support, comprising a block secured to said support, said block having an outwardly projecting boss thereon, a plate fitting against said block, and having an aperture therein within which said boss is received, said plate forming a housing adjacent one end which housing is open at its inner side, said housing having an aperture therein through which a cable may extend, means within said housing for securing the end of the cable thereto, a bar normally extending across said plate and bearing against said boss, said bar having inturned lugs at its ends normally engaging the sides of said plate, and a stud projecting through said bar and fitting within a screw threaded aperture within said block.

4. The structure defined in claim 3, said bar being recessed to snugly receive the head of said stud and said stud having a key receiving socket in its head.

5. A device for securing a cable of a street lamp to a support comprising a block, said block having an outwardly projecting boss thereon, spikes securing said block to said support, a plate overlying said block and having an aperture therein within which said boss and the heads of said spikes are received, means at one end of said plate for attaching a cable thereto, a bar normally extending across said plate and bearing against said boss, said bar having portions normally bearing against the side of said plate, and a stud securing said bar to said block, said aperture being of such size as to permit passage of said bar therethrough when said stud is loosened and said bar has been swung to extend substantially longitudinally of said plate.

6. A street lamp cable anchoring device comprising a housing having front and side walls and an open inner side and within which housing the lower end of a cable may be received, means for securing the lower end of a cable within said housing and means for releasably connecting said housing to a post in such manner that the post will close the open inner side of said housing.

7. A street lamp cable anchoring device comprising a housing having front and side walls and an open back, a stud mounted in the front wall of said housing and acting in conjunction with said side walls to clamp a looped end of a cable disposed within the housing to the housing, and means releasably connecting said housing to a post with the open back of said housing disposed against the post to prevent unauthorized entry to said housing.

8. The structure defined in claim 7, said housing having a small passage through said side walls for the cable.

9. A street lamp cable anchoring device comprising a housing having front and side walls and an open back and within which housing the lower end of a cable may be received, said housing having a small passage through said side walls for the cable, means for securing the lower end of the cable within said housing and means for releasably connecting said housing to a post in such manner that the post will close the open back of said housing.

10. A street lamp cable anchoring device comprising a housing having front and side walls and an open back and within which housing the lower end of a cable may be received, clamping means for securing the lower end of a cable within said housing and means for releasably connecting said housing to a post in such manner that the post will close the open back of said housing.

11. A device for securing a cable to a support comprising a block mounted on said support, a plate overlying said block and having a longitudinal aperture therein, a bar mounted for turning movement on said block and normally overlying said plate and extending cross wise of said aperture to bear against said plate, said bar being of such a length and so positioned relative to said aperture that when said bar is turned to extend generally parallel to the length of said aperture, said plate may be removed from said block and said bar will be received within said aperture and means at one end of said plate for securing a cable thereto.

In testimony whereof I affix my signature.

OTTO ANKLAM.